United States Patent
Chandler et al.

(10) Patent No.: US 10,532,344 B2
(45) Date of Patent: Jan. 14, 2020

(54) NO$_x$ TRAP

(71) Applicant: Johnson Matthey Public Limited Company, London (GB)

(72) Inventors: Guy Richard Chandler, Royston (GB); Paul Richard Phillips, Royston (GB); Stuart David Reid, Royston (GB); Wolfgang Strehlau, Sulzbach (DE); Daniel Swallow, Royston (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 16/273,271

(22) Filed: Feb. 12, 2019

(65) Prior Publication Data

US 2019/0176129 A1  Jun. 13, 2019

Related U.S. Application Data

(63) Continuation of application No. 15/692,021, filed on Aug. 31, 2017, now Pat. No. 10,213,768.

(30) Foreign Application Priority Data

Sep. 2, 2016  (GB) .................................. 1614923.9

(51) Int. Cl.
| | | |
|---|---|---|
| *B01J 35/00* | (2006.01) | |
| *B01J 23/46* | (2006.01) | |
| *F01N 3/28* | (2006.01) | |
| *B01D 53/94* | (2006.01) | |
| *B01J 21/04* | (2006.01) | |
| *B01J 23/00* | (2006.01) | |
| *B01J 23/02* | (2006.01) | |
| *B01J 23/10* | (2006.01) | |
| *B01J 23/44* | (2006.01) | |
| *B01J 35/04* | (2006.01) | |
| *B01J 35/10* | (2006.01) | |
| *B01J 37/02* | (2006.01) | |
| *B01J 37/08* | (2006.01) | |
| *F01N 3/08* | (2006.01) | |

(52) U.S. Cl.
CPC ............ *B01J 23/464* (2013.01); *B01D 53/94* (2013.01); *B01D 53/9422* (2013.01); *B01J 21/04* (2013.01); *B01J 23/005* (2013.01); *B01J 23/02* (2013.01); *B01J 23/10* (2013.01); *B01J 23/44* (2013.01); *B01J 35/0006* (2013.01); *B01J 35/04* (2013.01); *B01J 35/1014* (2013.01); *B01J 37/0236* (2013.01); *B01J 37/0244* (2013.01); *B01J 37/08* (2013.01); *F01N 3/0814* (2013.01); *F01N 3/0821* (2013.01); *F01N 3/0842* (2013.01); *F01N 3/2803* (2013.01); *B01D 2255/1025* (2013.01); *B01D 2255/2042* (2013.01); *B01D 2255/2047* (2013.01); *B01D 2255/2065* (2013.01); *B01D 2255/2092* (2013.01); *B01D 2255/9022* (2013.01); *B01D 2255/91* (2013.01); *F01N 2510/0684* (2013.01); *F01N 2570/14* (2013.01); *F01N 2570/16* (2013.01); *Y02A 50/2344* (2018.01); *Y02T 10/22* (2013.01); *Y02T 10/24* (2013.01)

(58) Field of Classification Search
CPC ......... B01D 53/94; B01J 23/464; B01J 21/04; B01J 23/02; F01N 3/2066
USPC ......................................... 422/168, 171, 177
See application file for complete search history.

(56) References Cited

U.S. PATENT DOCUMENTS

| | | | |
|---|---|---|---|
| 9,656,209 B2 | 5/2017 | Chang et al. | |
| 2015/0182912 A1* | 7/2015 | Fisher ................ | B01D 53/9413 423/213.2 |
| 2016/0047286 A1* | 2/2016 | Swallow ............... | F01N 3/2066 60/274 |

* cited by examiner

Primary Examiner — Tom P Duong

(57) ABSTRACT

A NO$_x$ trap catalyst is disclosed. The NO$_x$ trap catalyst comprises a noble metal, a NO$_x$ storage component, a support, and a first ceria-containing material. The first ceria-containing material is pre-aged prior to incorporation into the NOx trap catalyst, and may have a surface area of less than 80 m$^2$/g. The invention also includes exhaust systems comprising the NO$_x$ trap catalyst, and a method for treating exhaust gas utilizing the NO$_x$ trap catalyst.

7 Claims, No Drawings

$NO_x$ TRAP

FIELD OF THE INVENTION

The invention relates to a $NO_x$ trap for exhaust systems for internal combustion engines, and a method for treating an exhaust gas from an internal combustion engine.

BACKGROUND OF THE INVENTION

Internal combustion engines produce exhaust gases containing a variety of pollutants, including hydrocarbons, carbon monoxide, nitrogen oxides ("$NO_x$"), sulfur oxides, and particulate matter. Increasingly stringent national and regional legislation has lowered the amount of pollutants that can be emitted from such diesel or gasoline engines. Many different techniques have been applied to exhaust systems to clean the exhaust gas before it passes to atmosphere.

One such technique utilized to clean exhaust gas is the $NO_x$ adsorber catalyst (or "$NO_x$ trap"). $NO_x$ traps are devices that adsorb $NO_x$ under lean exhaust conditions, release the adsorbed $NO_x$ under rich conditions, and reduce the released $NO_x$ to form $N_2$. A $NO_x$ trap typically includes a $NO_x$ adsorbent for the storage of $NO_x$ and an oxidation/reduction catalyst.

The $NO_x$ adsorbent component is typically an alkaline earth metal (such as Ba, Ca, Sr, and Mg), an alkali metal (such as K, Na, Li, and Cs), a rare earth metal (such as La, Y, Pr, and Nd), or combinations thereof. These metals are typically found in the form of oxides. The oxidation/reduction catalyst is typically one or more noble metals, preferably platinum, palladium, and/or rhodium. Typically, platinum is included to perform the oxidation function and rhodium is included to perform the reduction function. The oxidation/reduction catalyst and the $NO_x$ adsorbent are typically loaded on a support material such as an inorganic oxide for use in the exhaust system.

The $NO_x$ trap performs three functions. First, nitric oxide reacts with oxygen to produce $NO_2$ in the presence of the oxidation catalyst. Second, the $NO_2$ is adsorbed by the $NO_x$ adsorbent in the form of an inorganic nitrate (for example, BaO or $BaCO_3$ is converted to $Ba(NO_3)_2$ on the $NO_x$ adsorbent). Lastly, when the engine runs under rich conditions, the stored inorganic nitrates decompose to form NO or $NO_2$ which are then reduced to form $N_2$ by reaction with carbon monoxide, hydrogen and/or hydrocarbons in the presence of the reduction catalyst. Typically, the nitrogen oxides are converted to nitrogen, carbon dioxide and water in the presence of heat, carbon monoxide and hydrocarbons in the exhaust stream.

During $NO_x$ trap regeneration, reductant from the engine is consumed in reducing stored $NO_x$ and stored $O_2$ in the catalyst. The level of oxygen storage capacity (OSC) is much greater in a fresh $NO_x$ trap compared to an aged $NO_x$ trap, resulting in the need for much longer regeneration lengths for fresh traps.

As with any automotive system and process, it is desirable to attain still further improvements in exhaust gas treatment systems. We have discovered a new $NO_x$ trap that shows a significant reduction in OSC, but with the same $NO_x$ activity when tested on an engine.

SUMMARY OF THE INVENTION

In a first aspect of the invention there is provided a NOx trap catalyst comprising a substrate, a first layer, and a second layer;

wherein the first layer comprises a NOx trap composition comprising one or more noble metals, a NOx storage component, a first support material, and a first ceria-containing material, wherein the first ceria-containing material is pre-aged prior to incorporation into the first layer; and the second layer comprises rhodium, a second ceria-containing material, and a second support material, wherein the second ceria-containing material is not pre-aged prior to incorporation into the second layer.

In a second aspect of the invention there is provided an emission treatment system for treating a flow of a combustion exhaust gas comprising the NOx trap catalyst as hereinbefore defined.

In a third aspect of the invention there is provided a method of treating an exhaust gas from an internal combustion engine comprising contacting the exhaust gas with the NOx trap catalyst as hereinbefore defined.

In a fourth aspect of the invention there is provided a method of reducing the oxygen storage capacity of a first ceria-containing material in a NOx trap catalyst, comprising pre-aging the first ceria-containing material prior to incorporating it into the NOx trap catalyst. In a fifth aspect of the invention there is provided a use of a pre-aged ceria-containing material to reduce the oxygen storage capacity of a NOx trap catalyst.

DEFINITIONS

The term "washcoat" is well known in the art and refers to an adherent coating that is applied to a substrate, usually during production of a catalyst.

The acronym "PGM" as used herein refers to "platinum group metal". The term "platinum group metal" generally refers to a metal selected from the group consisting of Ru, Rh, Pd, Os, Ir and Pt, preferably a metal selected from the group consisting of Ru, Rh, Pd, Ir and Pt. In general, the term "PGM" preferably refers to a metal selected from the group consisting of Rh, Pt and Pd.

The term "mixed oxide" as used herein generally refers to a mixture of oxides in a single phase, as is conventionally known in the art. The term "composite oxide" as used herein generally refers to a composition of oxides having more than one phase, as is conventionally known in the art.

DETAILED DESCRIPTION OF THE INVENTION

The NOx trap catalyst of the present invention comprises a substrate, a first layer, and a second layer;

wherein the first layer comprises a NOx trap composition comprising one or more noble metals, a NOx storage component, a first support material, and a first ceria-containing material, wherein the first ceria-containing material is pre-aged prior to incorporation into the first layer; and the second layer comprises rhodium, a second ceria-containing material, and a second support material, wherein the second ceria-containing material is not pre-aged prior to incorporation into the second layer. Preferably the first ceria-containing material has a surface area of less than 80 $m^2/g$. More preferably, the first ceria-containing material has a surface area of 40-75 $m^2/g$.

The noble metal is preferably platinum, palladium, gold, rhodium, or mixtures thereof; most preferably, the noble metal is platinum, palladium, or mixtures thereof, i.e. a mixture of platinum and palladium. Preferably, the noble metal loading in the $NO_x$ trap composition will range from 40 to 250 $g/ft^3$. The $NO_x$ trap composition preferably comprises 0.1 to 10 weight percent noble metal, more preferably 0.5 to 5 weight percent noble metal, and most preferably 1 to 3 weight percent noble metal.

The support is preferably an inorganic oxide, and more preferably includes oxides of Groups 2, 3, 4, 5, 13 and 14 elements. Most preferably, the support is an alumina, silica, titania, zirconia, magnesia, niobia, tantalum oxide, molybdenum oxide, tungsten oxide, a mixed oxide or composite oxide of any two or more thereof (e.g. silica-alumina, magnesia-alumina, ceria-zirconia or alumina-ceria-zirconia), and mixtures thereof. Especially preferred is a magnesia-alumina support. The magnesia-alumina is preferably a spinel, a magnesia-alumina mixed metal oxide, a hydrotalcite or hydrotalcite-like material, and combinations of two or more thereof. More preferably, the magnesia-alumina support is a spinel.

Preferred support materials preferably have surface areas in the range 10 to 1500 $m^2/g$, pore volumes in the range 0.1 to 4 mL/g, and pore diameters from about 10 to 1000 Angstroms. High surface area supports having a surface area greater than 80 $m^2/g$ are particularly preferred. e.g. high surface area ceria or alumina. Other preferred support materials include magnesia/alumina composite oxides, optionally further comprising a cerium-containing component, e.g. ceria. In such cases the ceria may be present on the surface of the magnesia/alumina composite oxide, e.g. as a coating, or may be present as a dopant.

The $NO_x$ storage component preferably comprises alkaline earth metals (such as barium, calcium, strontium, and magnesium), alkali metals (such as potassium, sodium, lithium, and cesium), rare earth metals (such as lanthanum, yttrium, praseodymium and neodymium), or combinations thereof. Most preferably, the $NO_x$ storage component comprises barium. These metals are typically found in the form of oxides.

Preferably, the $NO_x$ storage component is deposited on the support (such as a magnesia-alumina). The $NO_x$ storage component may be loaded onto the support by any known means, the manner of addition is not considered to be particularly critical. For example, a barium compound (such as barium acetate) may be added to a magnesia-alumina by impregnation, adsorption, ion-exchange, incipient wetness, precipitation, spray drying, or the like. Preferably, if the $NO_x$ storage component is deposited on the support, the support contains at least 0.5 weight percent $NO_x$ storage component.

The first ceria-containing material is preferably ceria, ceria-zirconia, ceria-zirconia-alumina, or mixtures thereof. More preferably, the first ceria-containing material is ceria, and in particular, particulate ceria. The first ceria-containing material has a surface area of less than 80 $m^2/g$, more preferably less than 75 $m^2/g$. The first ceria-containing material may have a surface area of 40 to 75 $m^2/g$, preferably 50 to 70 $m^2/g$. The first ceria-containing material may be manufactured in such a way to produce a surface area of less than 80 $m^2/g$ or may be a higher surface area ceria-containing material that has been treated (such as by pre-aging) to produce a surface area of less than 80 $m^2/g$.

Pre-aging the first ceria-containing material prior to incorporation into the $NO_x$ trap composition will preferably reduce the oxygen storage capacity of the $NO_x$ trap composition by greater than 40% compared to a fresh $NO_x$ trap composition that contains no pre-aged ceria-containing material.

The second ceria-containing material preferably has a surface area of greater than 80 $m^2/g$. The second ceria-containing material preferably has higher oxygen storage capacity than the first ceria-containing material. The second ceria-containing material may be what is commonly known in the art as a "high surface area" ceria.

The $NO_x$ trap catalyst of the invention may comprise further components that are known to the skilled person. For example, the catalysts of the invention may further comprise at least one binder and/or at least one surfactant. Where a binder is present, dispersible alumina binders are preferred.

The $NO_x$ trap catalyst of the present invention may be prepared by any suitable means. Preferably, the one or more noble metals, and/or first ceria-containing material, and/or $NO_x$ storage material are loaded onto the support by any known means to form the $NO_x$ trap catalyst composition. The manner of addition is not considered to be particularly critical. For example, a noble metal compound (such as platinum nitrate) and a cerium compound (such as cerium nitrate, as a precursor to the first ceria-containing material) may be supported on a support (such as an alumina) by impregnation, adsorption, ion-exchange, incipient wetness, precipitation, or the like, or by any other means commonly known in the art.

The order of addition of the noble metal compound and/or $NO_x$ storage component and/or first ceria-containing material to the support is not considered critical. For example, the platinum, $NO_x$ storage component and first ceria-containing material may be added to the support simultaneously, or may be added sequentially in any order.

In some embodiments of the invention, the first ceria-containing material is pre-aged prior to incorporation into the $NO_x$ trap composition. The pre-aging is preferably performed by heating a ceria-containing material at a temperature greater than 700° C. (more preferably, greater than 750° C., and most preferably at least 800° C.; for example, between 750 and 950° C.) in the absence of added water. By added water, it is meant that water is not deliberately added to the heating process. The heating may be performed in an oxygen-containing gas (such as air) or in an inert gas (such as nitrogen). The heating is preferably performed for greater than 0.25 hours, more preferably greater than 0.5 hour, and most preferably at least 1 hour. Following pre-aging, the surface area of the first ceria-containing material is preferably less than 80 $m^2/g$. Surface area is measured using a Micromeritics Tristar 3000 system, running a 30 point analysis. The samples are degassed prior to analysis at 350° C. for 1 hour and the surface area measured using nitrogen at target relative pressures from ~2 to 100 kPa.

The substrate may be a flow-through substrate or a filter substrate, but is preferably a flow-through monolith substrate.

The flow-through monolith substrate has a first face and a second face defining a longitudinal direction therebetween. The flow-through monolith substrate has a plurality of channels extending between the first face and the second face. The plurality of channels extend in the longitudinal direction and provide a plurality of inner surfaces (e.g. the surfaces of the walls defining each channel). Each of the plurality of channels has an opening at the first face and an opening at the second face. For the avoidance of doubt, the flow-through monolith substrate is not a wall flow filter.

The first face is typically at an inlet end of the substrate and the second face is at an outlet end of the substrate.

The channels may be of a constant width and each plurality of channels may have a uniform channel width.

Preferably within a plane orthogonal to the longitudinal direction, the monolith substrate has from 100 to 500 channels per square inch, preferably from 200 to 400. For example, on the first face, the density of open first channels and closed second channels is from 200 to 400 channels per square inch. The channels can have cross sections that are rectangular, square, circular, oval, triangular, hexagonal, or other polygonal shapes.

The monolith substrate acts as a support for holding catalytic material. Suitable materials for forming the monolith substrate include ceramic-like materials such as cordierite, silicon carbide, silicon nitride, zirconia, mullite, spodumene, alumina-silica magnesia or zirconium silicate, or of porous, refractory metal. Such materials and their use in the manufacture of porous monolith substrates is well known in the art.

It should be noted that the flow-through monolith substrate described herein is a single component (i.e. a single brick). Nonetheless, when forming an emission treatment system, the monolith used may be formed by adhering together a plurality of channels or by adhering together a plurality of smaller monoliths as described herein. Such techniques are well known in the art, as well as suitable casings and configurations of the emission treatment system.

In an alternative aspect of the invention, the $NO_x$ trap catalyst comprises, consists essentially of or consists of the $NO_x$ trap composition as hereinbefore described extruded to form a flow-through or filter substrate.

In embodiments wherein the $NO_x$ trap catalyst comprises a ceramic substrate, the ceramic substrate may be made of any suitable refractory material, e.g., alumina, silica, titania, ceria, zirconia, magnesia, zeolites, silicon nitride, silicon carbide, zirconium silicates, magnesium silicates, aluminosilicates and metallo aluminosilicates (such as cordierite and spodumene), or a mixture or mixed oxide of any two or more thereof. Cordierite, a magnesium aluminosilicate, and silicon carbide are particularly preferred.

In embodiments wherein the $NO_x$ trap catalyst comprises a metallic substrate, the metallic substrate may be made of any suitable metal, and in particular heat-resistant metals and metal alloys such as titanium and stainless steel as well as ferritic alloys containing iron, nickel, chromium, and/or aluminium in addition to other trace metals.

Preferably, the $NO_x$ trap catalyst as hereinbefore described is prepared by depositing the $NO_x$ trap composition as hereinbefore described on the substrate using washcoat procedures. A representative process for preparing the $NO_x$ trap catalyst using a washcoat procedure is set forth below. It will be understood that the process below can be varied according to different embodiments of the invention.

The washcoating is preferably performed by first slurrying finely divided particles of the $NO_x$ trap composition in an appropriate solvent, preferably water, to form a slurry. The slurry preferably contains between 5 to 70 weight percent solids, more preferably between 10 to 50 weight percent. Preferably, the particles are milled or subject to another comminution process in order to ensure that substantially all of the solid particles have a particle size of less than 20 microns in an average diameter, prior to forming the slurry. Additional components, such as stabilizers or promoters, may also be incorporated in the slurry as a mixture of water soluble or water-dispersible compounds or complexes.

The substrate may then be coated one or more times with the slurry such that there will be deposited on the substrate the desired loading of the $NO_x$ trap composition.

Preferably, the $NO_x$ trap catalyst comprises a substrate and at least one layer on the substrate. In one embodiment, the at least one layer comprises the $NO_x$ trap composition as hereinbefore described. This can be produced by the washcoat procedure described above. One or more additional layers may be added to the one layer of $NO_x$ trap composition.

In embodiments wherein one or more additional layers are present (i.e. in addition to the $NO_x$ trap composition), the one or more additional layers have a different composition to the first layer comprising the $NO_x$ trap composition.

The one or more additional layers may comprise one zone or a plurality of zones, e.g. two or more zones. Where the one or more additional layers comprise a plurality of zones, the zones are preferably longitudinal zones. The plurality of zones, or each individual zone, may also be present as a gradient, i.e. a zone may not be of a uniform thickness along its entire length, to form a gradient. Alternatively a zone may be of uniform thickness along its entire length.

In some preferred embodiments, one additional layer, i.e. a second layer, is present.

Typically, the second layer comprises a platinum group metal (PGM) (referred to below as the "second platinum group metal"). It is generally preferred that the second layer comprises the second platinum group metal (PGM) as the only platinum group metal (i.e. there are no other PGM components present in the catalytic material, except for those specified).

The second PGM may be selected from the group consisting of platinum, palladium, and a combination or mixture of platinum (Pt) and palladium (Pd). Preferably, the platinum group metal is selected from the group consisting of palladium (Pd) and a combination or a mixture of platinum (Pt) and palladium (Pd). More preferably, the platinum group metal is selected from the group consisting of a combination or a mixture of platinum (Pt) and palladium (Pd).

It is generally preferred that the second layer is (i.e. is formulated) for the oxidation of carbon monoxide (CO) and/or hydrocarbons (HCs).

Preferably, the second layer comprises palladium (Pd) and optionally platinum (Pt) in a ratio by weight of 1:0 (e.g. Pd only) to 1:4 (this is equivalent to a ratio by weight of Pt:Pd of 4:1 to 0:1). More preferably, the second layer comprises platinum (Pt) and palladium (Pd) in a ratio by weight of <4:1, such as ≤3.5:1.

When the platinum group metal is a combination or mixture of platinum and palladium, then the second layer comprises platinum (Pt) and palladium (Pd) in a ratio by weight of 5:1 to 3.5:1, preferably 2.5:1 to 1:2.5, more preferably 1:1 to 2:1.

The second layer typically further comprises a support material (referred to herein below as the "second support material"). The second PGM is generally disposed or supported on the second support material.

The second support material is preferably a refractory oxide. It is preferred that the refractory oxide is selected from the group consisting of alumina, silica, ceria, silica alumina, ceria-alumina, ceria-zirconia and alumina-magnesium oxide. More preferably, the refractory oxide is selected from the group consisting of alumina, ceria, silica-alumina and ceria-zirconia. Even more preferably, the refractory oxide is alumina or silica-alumina, particularly silica-alumina.

A particularly preferred second layer comprises a silica-alumina support, platinum, palladium, barium, a molecular sieve, and a platinum group metal (PGM) on an alumina support, e.g. a rare earth-stabilised alumina. Particularly preferably, this preferred second layer comprises a first zone comprising a silica-alumina support, platinum, palladium, barium, a molecular sieve, and a second zone comprising a platinum group metal (PGM) on an alumina support, e.g. a rare earth-stabilised alumina. This preferred second layer may have activity as an oxidation catalyst, e.g. as a diesel oxidation catalyst (DOC).

A further preferred second layer comprises, consists of, or consists essentially of a platinum group metal on alumina. This preferred second layer may have activity as an oxidation catalyst, e.g. as a $NO_2$-maker catalyst.

A further preferred second layer comprises a platinum group metal, rhodium, and a cerium-containing component.

A particularly preferred second layer comprises rhodium, a cerium-containing component, and an inorganic support. Preferably the inorganic support comprises alumina, e.g is alumina. In preferred embodiments comprising this preferred second layer, the cerium-containing component in the preferred second layer is not pre-aged prior to incorporation into the layer, and does not have a surface area of less than 80 $m^2/g$. In other words, in preferred embodiments comprising this preferred second layer, the first ceria-containing component in the first layer is a different material to the second ceria-containing component in the first layer. For example, the surface area of the first ceria-containing component in the first layer is lower than the surface area of the second ceria-containing component in the second layer.

A particularly preferred embodiment of the $NO_x$ trap catalyst of the present invention therefore comprises a first layer comprising a first ceria-containing component having a surface area of less than 80 $m^2/g$, e.g. 40-75 $m^2/g$, preferably 55-70 $m^2/g$; a Ba/Ce/magnesium-aluminate spinel; platinum; palladium; and alumina; and a second layer comprising a second ceria-containing component having a higher surface area than the first ceria-containing component present in the first layer; rhodium; and alumina.

In other preferred embodiments, more than one of the preferred second layers described above are present, in addition to the $NO_x$ trap composition. In such embodiments, the one or more additional layers may be present in any configuration, including zoned configurations.

The $NO_x$ trap composition may be disposed or supported on the second layer or the substrate (e.g. the plurality of inner surfaces of the through-flow monolith substrate), preferably the second layer is disposed or supported on the $NO_x$ trap composition.

The second layer may be disposed or supported on the substrate (e.g. the plurality of inner surfaces of the through-flow monolith substrate).

The second layer may be disposed or supported on the entire length of the substrate or the $NO_x$ trap composition. Alternatively the second layer may be disposed or supported on a portion, e.g. 5%, 10%, 20%, 30%, 40%, 50%, 60%, 70%, 80%, 90%, or 95%, of the substrate or the $NO_x$ trap composition. Preferably, the entire length of the substrate is coated with the $NO_x$ trap composition.

The $NO_x$ trap catalyst of the present invention may be prepared by processes well known in the prior art. Preferably, the $NO_x$ trap is prepared by depositing the $NO_x$ trap composition on the substrate using washcoat procedures. Preferably, the entire length of the substrate is coated with the $NO_x$ trap composition so that a washcoat of the $NO_x$ trap composition covers the entire surface of the substrate.

A representative process for preparing the $NO_x$ trap catalyst using a washcoat procedure is set forth below. It will be understood that the process below can be varied according to different embodiments of the invention.

The $NO_x$ trap is preferably prepared using a washcoat procedure. The noble metal and $NO_x$ storage component are preferably added to the support and then combined with the first ceria-containing material prior to the washcoating step.

The noble metal and $NO_x$ storage component may be loaded onto the support by any known means, the manner of addition is not considered to be particularly critical. For example, a platinum or palladium compound (such as platinum nitrate) may be added to the support by impregnation, adsorption, ion-exchange, incipient wetness, spray drying, precipitation, or the like to produce a supported noble metal, followed by addition of a $NO_x$ storage component (such as barium acetate).

A further aspect of the invention is an emission treatment system for treating a flow of a combustion exhaust gas that comprises the $NO_x$ trap catalyst as hereinbefore described. In preferred systems, the internal combustion engine is a diesel engine, preferably a light duty diesel engine. The $NO_x$ trap catalyst may be placed in a close-coupled position or in the underfloor position.

The emission treatment system typically further comprises an emissions control device.

The emissions control devices is preferably downstream of the $NO_x$ trap catalyst.

Examples of an emissions control device include a diesel particulate filter (DPF), a lean $NO_x$ trap (LNT), a lean $NO_x$ catalyst (LNC), a selective catalytic reduction (SCR) catalyst, a diesel oxidation catalyst (DOC), a catalysed soot filter (CSF), a selective catalytic reduction filter (SCRF™) catalyst, an ammonia slip catalyst (ASC) and combinations of two or more thereof. Such emissions control devices are all well known in the art.

Some of the aforementioned emissions control devices have filtering substrates. An emissions control device having a filtering substrate may be selected from the group consisting of a diesel particulate filter (DPF), a catalysed soot filter (CSF), and a selective catalytic reduction filter (SCRF™) catalyst.

It is preferred that the emission treatment system comprises an emissions control device selected from the group consisting of a lean $NO_x$ trap (LNT), an ammonia slip catalyst (ASC), a diesel particulate filter (DPF), a selective catalytic reduction (SCR) catalyst, a catalysed soot filter (CSF), a selective catalytic reduction filter (SCRF™) catalyst, and combinations of two or more thereof. More preferably, the emissions control device is selected from the group consisting of a diesel particulate filter (DPF), a selective catalytic reduction (SCR) catalyst, a catalysed soot filter (CSF), a selective catalytic reduction filter (SCRF™) catalyst, and combinations of two or more thereof. Even more preferably, the emissions control device is a selective catalytic reduction (SCR) catalyst or a selective catalytic reduction filter (SCRF™) catalyst.

When the emission treatment system of the invention comprises an SCR catalyst or an SCRF™ catalyst, then the emission treatment system may further comprise an injector for injecting a nitrogenous reductant, such as ammonia, or an ammonia precursor, such as urea or ammonium formate, preferably urea, into exhaust gas downstream of the $NO_x$ trap catalyst and upstream of the SCR catalyst or the SCRF™ catalyst.

Such an injector may be fluidly linked to a source (e.g. a tank) of a nitrogenous reductant precursor. Valve-controlled dosing of the precursor into the exhaust gas may be regulated by suitably programmed engine management means and closed loop or open loop feedback provided by sensors monitoring the composition of the exhaust gas.

Ammonia can also be generated by heating ammonium carbamate (a solid) and the ammonia generated can be injected into the exhaust gas.

Alternatively or in addition to the injector, ammonia can be generated in situ (e.g. during rich regeneration of a LNT disposed upstream of the SCR catalyst or the SCRF™ catalyst), e.g. a $NO_x$ trap catalyst comprising the $NO_x$ trap composition of the invention. Thus, the emission treatment system may further comprise an engine management means for enriching the exhaust gas with hydrocarbons.

The SCR catalyst or the SCRF™ catalyst may comprise a metal selected from the group consisting of at least one of Cu, Hf, La, Au, In, V, lanthanides and Group VIII transition metals (e.g. Fe), wherein the metal is supported on a refractory oxide or molecular sieve. The metal is preferably selected from Ce, Fe, Cu and combinations of any two or more thereof, more preferably the metal is Fe or Cu.

The refractory oxide for the SCR catalyst or the SCRF™ catalyst may be selected from the group consisting of $Al_2O_3$, $TiO_2$, $CeO_2$, $SiO_2$, $ZrO_2$ and mixed oxides containing two or more thereof. The non-zeolite catalyst can also include tungsten oxide (e.g. $V_2O_5/WO_3/TiO_2$, $WO_x/CeZrO_2$, $WO_x/ZrO_2$ or $Fe/WO_x/ZrO_2$).

It is particularly preferred when an SCR catalyst, an SCRF™ catalyst or a washcoat thereof comprises at least one molecular sieve, such as an aluminosilicate zeolite or a SAPO. The at least one molecular sieve can be a small, a medium or a large pore molecular sieve. By "small pore molecular sieve" herein we mean molecular sieves containing a maximum ring size of 8, such as CHA; by "medium pore molecular sieve" herein we mean a molecular sieve containing a maximum ring size of 10, such as ZSM-5; and by "large pore molecular sieve" herein we mean a molecular sieve having a maximum ring size of 12, such as beta. Small pore molecular sieves are potentially advantageous for use in SCR catalysts.

In the emission treatment system of the invention, preferred molecular sieves for an SCR catalyst or an SCRF™ catalyst are synthetic aluminosilicate zeolite molecular sieves selected from the group consisting of AEI, ZSM-5, ZSM-20, ERI including ZSM-34, mordenite, ferrierite, BEA including Beta, Y, CHA, LEV including Nu-3, MCM-22 and EU-1, preferably AEI or CHA, and having a silica-to-alumina ratio of about 10 to about 50, such as about 15 to about 40.

In a first emission treatment system embodiment, the emission treatment system comprises the $NO_x$ trap catalyst of the invention and a catalysed soot filter (CSF). The $NO_x$ trap catalyst is typically followed by (e.g. is upstream of) the catalysed soot filter (CSF). Thus, for example, an outlet of the $NO_x$ trap catalyst is connected to an inlet of the catalysed soot filter.

A second emission treatment system embodiment relates to an emission treatment system comprising the $NO_x$ trap catalyst of the invention, a catalysed soot filter (CSF) and a selective catalytic reduction (SCR) catalyst.

The $NO_x$ trap catalyst is typically followed by (e.g. is upstream of) the catalysed soot filter (CSF). The catalysed soot filter is typically followed by (e.g. is upstream of) the selective catalytic reduction (SCR) catalyst. A nitrogenous reductant injector may be arranged between the catalysed soot filter (CSF) and the selective catalytic reduction (SCR) catalyst. Thus, the catalysed soot filter (CSF) may be followed by (e.g. is upstream of) a nitrogenous reductant injector, and the nitrogenous reductant injector may be followed by (e.g. is upstream of) the selective catalytic reduction (SCR) catalyst.

In a third emission treatment system embodiment, the emission treatment system comprises the $NO_x$ trap catalyst of the invention, a selective catalytic reduction (SCR) catalyst and either a catalysed soot filter (CSF) or a diesel particulate filter (DPF).

In the third emission treatment system embodiment, the $NO_x$ trap catalyst of the invention is typically followed by (e.g. is upstream of) the selective catalytic reduction (SCR) catalyst. A nitrogenous reductant injector may be arranged between the oxidation catalyst and the selective catalytic reduction (SCR) catalyst. Thus, the catalyzed monolith substrate may be followed by (e.g. is upstream of) a nitrogenous reductant injector, and the nitrogenous reductant injector may be followed by (e.g. is upstream of) the selective catalytic reduction (SCR) catalyst. The selective catalytic reduction (SCR) catalyst are followed by (e.g. are upstream of) the catalysed soot filter (CSF) or the diesel particulate filter (DPF).

A fourth emission treatment system embodiment comprises the $NO_x$ trap catalyst of the invention and a selective catalytic reduction filter (SCRF™) catalyst. The $NO_x$ trap catalyst of the invention is typically followed by (e.g. is upstream of) the selective catalytic reduction filter (SCRF™) catalyst.

A nitrogenous reductant injector may be arranged between the $NO_x$ trap catalyst and the selective catalytic reduction filter (SCRF™) catalyst. Thus, the $NO_x$ trap catalyst may be followed by (e.g. is upstream of) a nitrogenous reductant injector, and the nitrogenous reductant injector may be followed by (e.g. is upstream of) the selective catalytic reduction filter (SCRF™) catalyst.

When the emission treatment system comprises a selective catalytic reduction (SCR) catalyst or a selective catalytic reduction filter (SCRF™) catalyst, such as in the second to fourth exhaust system embodiments described hereinabove, an ASC can be disposed downstream from the SCR catalyst or the SCRF™ catalyst (i.e. as a separate monolith substrate), or more preferably a zone on a downstream or trailing end of the monolith substrate comprising the SCR catalyst can be used as a support for the ASC.

Another aspect of the invention relates to a vehicle. The vehicle comprises an internal combustion engine, preferably a diesel engine. The internal combustion engine, preferably the diesel engine, is coupled to an emission treatment system of the invention.

It is preferred that the diesel engine is configured or adapted to run on fuel, preferably diesel fuel, comprising ≤50 ppm of sulfur, more preferably ≤15 ppm of sulfur, such as ≤10 ppm of sulfur, and even more preferably ≤5 ppm of sulfur.

The vehicle may be a light-duty diesel vehicle (LDV), such as defined in US or European legislation. A light-duty diesel vehicle typically has a weight of <2840 kg, more preferably a weight of <2610 kg. In the US, a light-duty diesel vehicle (LDV) refers to a diesel vehicle having a gross weight of ≤8,500 pounds (US lbs). In Europe, the term light-duty diesel vehicle (LDV) refers to (i) passenger vehicles comprising no more than eight seats in addition to the driver's seat and having a maximum mass not exceeding 5 tonnes, and (ii) vehicles for the carriage of goods having a maximum mass not exceeding 12 tonnes. Alternatively, the vehicle may be a heavy-duty diesel vehicle (HDV), such as a diesel vehicle having a gross weight of >8,500 pounds (US lbs), as defined in US legislation.

A further aspect of the invention is a method of treating an exhaust gas from an internal combustion engine comprising contacting the exhaust gas with the $NO_x$ trap catalyst as hereinbefore described. In preferred methods, the exhaust gas is a rich gas mixture. In further preferred methods, the exhaust gas cycles between a rich gas mixture and a lean gas mixture.

In some preferred methods of treating an exhaust gas from an internal combustion engine, the exhaust gas is at a temperature of about 180 to 300° C.

In further preferred methods of treating an exhaust gas from an internal combustion engine, the exhaust gas is contacted with one or more further emissions control devices, in addition to the $NO_x$ trap catalyst as hereinbefore described. The emissions control device or devices is preferably downstream of the $NO_x$ trap catalyst.

Examples of a further emissions control device include a diesel particulate filter (DPF), a lean $NO_x$ trap (LNT), a lean $NO_x$ catalyst (LNC), a selective catalytic reduction (SCR) catalyst, a diesel oxidation catalyst (DOC), a catalysed soot filter (CSF), a selective catalytic reduction filter (SCRF™) catalyst, an ammonia slip catalyst (ASC) and combinations of two or more thereof. Such emissions control devices are all well known in the art.

Some of the aforementioned emissions control devices have filtering substrates. An emissions control device having a filtering substrate may be selected from the group consisting of a diesel particulate filter (DPF), a catalysed soot filter (CSF), and a selective catalytic reduction filter (SCRF™) catalyst.

It is preferred that the method comprises contacting the exhaust gas with an emissions control device selected from the group consisting of a lean $NO_x$ trap (LNT), an ammonia slip catalyst (ASC), a diesel particulate filter (DPF), a selective catalytic reduction (SCR) catalyst, a catalysed soot filter (CSF), a selective catalytic reduction filter (SCRF™) catalyst, and combinations of two or more thereof. More preferably, the emissions control device is selected from the group consisting of a diesel particulate filter (DPF), a selective catalytic reduction (SCR) catalyst, a catalysed soot filter (CSF), a selective catalytic reduction filter (SCRF™) catalyst, and combinations of two or more thereof. Even more preferably, the emissions control device is a selective catalytic reduction (SCR) catalyst or a selective catalytic reduction filter (SCRF™) catalyst.

When the method of the invention comprises contacting the exhaust gas with an SCR catalyst or an SCRF™ catalyst, then the method may further comprise the injection of a nitrogenous reductant, such as ammonia, or an ammonia precursor, such as urea or ammonium formate, preferably urea, into exhaust gas downstream of the $NO_x$ trap catalyst and upstream of the SCR catalyst or the SCRF™ catalyst.

Such an injection may be carried out by an injector. The injector may be fluidly linked to a source (e.g. a tank) of a nitrogenous reductant precursor. Valve-controlled dosing of the precursor into the exhaust gas may be regulated by suitably programmed engine management means and closed loop or open loop feedback provided by sensors monitoring the composition of the exhaust gas.

Ammonia can also be generated by heating ammonium carbamate (a solid) and the ammonia generated can be injected into the exhaust gas.

Alternatively or in addition to the injector, ammonia can be generated in situ (e.g. during rich regeneration of a LNT disposed upstream of the SCR catalyst or the SCRF™ catalyst). Thus, the method may further comprise enriching of the exhaust gas with hydrocarbons.

The SCR catalyst or the SCRF™ catalyst may comprise a metal selected from the group consisting of at least one of Cu, Hf, La, Au, In, V, lanthanides and Group VIII transition metals (e.g. Fe), wherein the metal is supported on a refractory oxide or molecular sieve. The metal is preferably selected from Ce, Fe, Cu and combinations of any two or more thereof, more preferably the metal is Fe or Cu.

The refractory oxide for the SCR catalyst or the SCRF™ catalyst may be selected from the group consisting of $Al_2O_3$, $TiO_2$, $CeO_2$, $SiO_2$, $ZrO_2$ and mixed oxides containing two or more thereof. The non-zeolite catalyst can also include tungsten oxide (e.g. $V_2O_5/WO_3/TiO_2$, $WO_x/CeZrO_2$, $WO_x/ZrO_2$ or $Fe/WO_x/ZrO_2$).

It is particularly preferred when an SCR catalyst, an SCRF™ catalyst or a washcoat thereof comprises at least one molecular sieve, such as an aluminosilicate zeolite or a SAPO. The at least one molecular sieve can be a small, a medium or a large pore molecular sieve. By "small pore molecular sieve" herein we mean molecular sieves containing a maximum ring size of 8, such as CHA; by "medium pore molecular sieve" herein we mean a molecular sieve containing a maximum ring size of 10, such as ZSM-5; and by "large pore molecular sieve" herein we mean a molecular sieve having a maximum ring size of 12, such as beta. Small pore molecular sieves are potentially advantageous for use in SCR catalysts.

In the method of treating an exhaust gas of the invention, preferred molecular sieves for an SCR catalyst or an SCRF™ catalyst are synthetic aluminosilicate zeolite molecular sieves selected from the group consisting of AEI, ZSM-5, ZSM-20, ERI including ZSM-34, mordenite, ferrierite, BEA including Beta, Y, CHA, LEV including Nu-3, MCM-22 and EU-1, preferably AEI or CHA, and having a silica-to-alumina ratio of about 10 to about 50, such as about 15 to about 40.

In a first embodiment, the method comprises contacting the exhaust gas with the $NO_x$ trap catalyst of the invention and a catalysed soot filter (CSF). The NOx trap is typically followed by (e.g. is upstream of) the catalysed soot filter (CSF). Thus, for example, an outlet of the $NO_x$ trap catalyst is connected to an inlet of the catalysed soot filter.

A second embodiment of the method of treating an exhaust gas relates to a method comprising contacting the exhaust gas with the $NO_x$ trap catalyst of the invention, a catalysed soot filter (CSF) and a selective catalytic reduction (SCR) catalyst.

The $NO_x$ trap catalyst trap is typically followed by (e.g. is upstream of) the catalysed soot filter (CSF). The catalysed soot filter is typically followed by (e.g. is upstream of) the selective catalytic reduction (SCR) catalyst. A nitrogenous reductant injector may be arranged between the catalysed soot filter (CSF) and the selective catalytic reduction (SCR) catalyst. Thus, the catalysed soot filter (CSF) may be followed by (e.g. is upstream of) a nitrogenous reductant injector, and the nitrogenous reductant injector may be followed by (e.g. is upstream of) the selective catalytic reduction (SCR) catalyst.

In a third embodiment of the method of treating an exhaust gas, the method comprises contacting the exhaust gas with the $NO_x$ trap catalyst of the invention, a selective catalytic reduction (SCR) catalyst and either a catalysed soot filter (CSF) or a diesel particulate filter (DPF).

In the third embodiment of the method of treating an exhaust gas, the $NO_x$ trap catalyst of the invention is typically followed by (e.g. is upstream of) the selective catalytic reduction (SCR) catalyst. A nitrogenous reductant injector may be arranged between the oxidation catalyst and the selective catalytic reduction (SCR) catalyst. Thus, the $NO_x$ trap catalyst may be followed by (e.g. is upstream of) a nitrogenous reductant injector, and the nitrogenous reductant injector may be followed by (e.g. is upstream of) the selective catalytic reduction (SCR) catalyst. The selective catalytic reduction (SCR) catalyst are followed by (e.g. are upstream of) the catalysed soot filter (CSF) or the diesel particulate filter (DPF).

A fourth embodiment of the method of treating an exhaust gas comprises the NO$_x$ trap catalyst of the invention and a selective catalytic reduction filter (SCRF™) catalyst. The NO$_x$ trap catalyst of the invention is typically followed by (e.g. is upstream of) the selective catalytic reduction filter (SCRF™) catalyst.

A nitrogenous reductant injector may be arranged between the NO$_x$ trap catalyst and the selective catalytic reduction filter (SCRF™) catalyst. Thus, the NO$_x$ trap catalyst may be followed by (e.g. is upstream of) a nitrogenous reductant injector, and the nitrogenous reductant injector may be followed by (e.g. is upstream of) the selective catalytic reduction filter (SCRF™) catalyst.

When the emission treatment system comprises a selective catalytic reduction (SCR) catalyst or a selective catalytic reduction filter (SCRF™) catalyst, such as in the second to fourth method embodiments described hereinabove, an ASC can be disposed downstream from the SCR catalyst or the SCRF™ catalyst (i.e. as a separate monolith substrate), or more preferably a zone on a downstream or trailing end of the monolith substrate comprising the SCR catalyst can be used as a support for the ASC.

A further aspect of the invention is a method of reducing the oxygen storage capacity of a ceria-containing material in a NO trap composition, comprising pre-aging the ceria-containing material prior to incorporating it into the NO trap composition. Preferably the pre-aging is performed by heating the ceria-containing material at a temperature greater than 700° C., e.g. between 750 and 950° C., in the absence of added water.

Without wishing to be bound by theory, it is proposed that by lowering the oxygen storage capacity of the ceria-containing material, a NO$_x$ trap catalyst that contains this material will have better selectivity towards N$_2$ production when the NO is released and reduced during a rich purge, as there will be a higher amount of reductants available to the reduce the NO$_x$.

A further aspect of the invention is the use of a pre-aged ceria-containing material to reduce the oxygen storage capacity of a NO$_x$ trap composition. Preferably the ceria-containing material is pre-aged by heating the ceria-containing material at a temperature greater than 700° C., e.g. between 750 and 950° C., in the absence of added water.

The following examples merely illustrate the invention. Those skilled in the art will recognize many variations that are within the spirit of the invention and scope of the claims.

EXAMPLE 1

Preparation OF NO$_x$ Traps (LNTs)

LNT 1A: NO$_x$ Trap with Pre-Aged Ceria

A 400 cell per square inch (cpsi) flow-through cordierite substrate monolith is coated with a NO$_x$ trap catalyst formulation comprising two layers. The lower layer washcoat comprises Pt, Pd, 37% of a Ba/Ce/magnesium-aluminate spinel and 53% ceria (93% of the total ceria loading includes particulate ceria). The surface area of the ceria used is 70 m$^2$/g, following pre-aging at 800° C. for 1 hour in air, and without any added water. The surface area of the particulate ceria was 120 m$^2$/g prior to pre-aging. The washcoat is coated on the virgin substrate monolith using the method disclosed in WO 99/47260, followed by drying for 30 minutes in a forced air drier at 100° C. and then firing at 500° C. for 2 hours.

A second slurry is prepared consisting of slurried particulate ceria followed by the addition of appropriate amounts of a soluble rhodium salt. The pH is then increased to 7.5 with the addition of NH$_3$ to hydrolyse the Rh onto the ceria, followed by the addition of alumina binders. The second slurry is applied to the calcined lower layer from via the inlet and outlet channels. The part is then dried and calcined at 500° C.

Comparative LNT 1B: NO$_x$ Trap without Pre-aging Ceria comparative LNT 1B is prepared in exactly the same way as LNT 1A except the particulate ceria used in the lower layer washcoat is not subjected to pre-aging and has a surface area of >120 m$^2$/g.

EXAMPLE 2

Oxygen Storage Testing

Fresh samples of LNT 1A and Comparative LNT 1B (1.38-inch diameter, 5-inch length cores) are subjected to an oxygen storage test, according to the following procedure. 5-inch cores of LNT 1A and Comparative LNT 1B are pre-conditioned at 600° C. in air for 1 hour before testing. Testing is performed on a synthetic gas rig with all testing done at a GHSV of 17,700 hr$^{-1}$. The temperature is then reduced to 200° C. under N$_2$ and 10 cycles of 30 seconds lean (1 vol.% O$_2$, balance N$_2$) and 30 seconds rich (2 vol.% CO, balance N$_2$) are performed to evaluate the oxygen storage capacity (OSC). The temperature is then ramped to 280° C. under nitrogen and the testing is repeated, followed by a ramping to 400° C. under nitrogen and the testing is repeated again. The oxygen storage capacity is then determined by calculation of the average O$_2$ removed by the catalyst from the inlet gas phase over the last 6 cycles of 30 s lean operation.

LNT 1A and Comparative LNT 1B are then re-tested using the same procedure following ageing in a hydrothermal gas mix of 20% O$_2$, 10% H$_2$O, balance of N$_2$ at 800° C. for 5h. The results for 280° C. are shown in Table 1.

TABLE 1

OSC Results at 280° C.

| | Oxygen consumption (mg/L) | |
|---|---|---|
| Test Run | Fresh | HT800° C. 5 h aged |
| LNT 1A | 983 | 753 |
| Comp. LNT 1B | 1380 | 930 |

It can be seen from the results in Table 1 that LNT 1A has significantly less OSC compared to Comparative LNT 1B, indicating that LNT 1A would require a much shorter regeneration length as compared to Comparative LNT 1B.

The invention claimed is:

1. A NOx trap catalyst comprising a first layer, the first layer comprising a first ceria-containing component having a surface area of less than 80 m$^2$/g, a Ba/Ce/magnesium-aluminate spinel; platinum; palladium; and alumina; and
a second layer, the second layer comprising a second ceria-containing component having a higher surface area than the first ceria-containing component present in the first layer; rhodium; and alumina; and
a substrate.

2. The NOx trap catalyst of claim 1, wherein the first ceria-containing material has a surface area of 40-75 $m^2/g$.

3. The NOx trap catalyst of claim 2, wherein the first ceria-containing material has a surface area of 55-70 $m^2/g$.

4. The NOx trap catalyst of claim 1, wherein the second layer further comprises platinum.

5. The NOx trap catalyst of claim 1, wherein the substrate is a flow-through monolith or a filter monolith.

6. An emission treatment system for treating a flow of a combustion exhaust gas comprising the NOx trap catalyst of claim 1.

7. The emission treatment system of claim 6, further comprising a selective catalytic reduction catalyst system, a particulate filter, a selective catalytic reduction filter system, a passive NOx adsorber, a three-way catalyst system, or combinations thereof.

* * * * *